No. 765,834. PATENTED JULY 26, 1904.
H. HEGELER & N. L. HEINZ.
APPARATUS FOR MAKING SULFURIC ACID.
APPLICATION FILED DEC. 26, 1903.
NO MODEL.
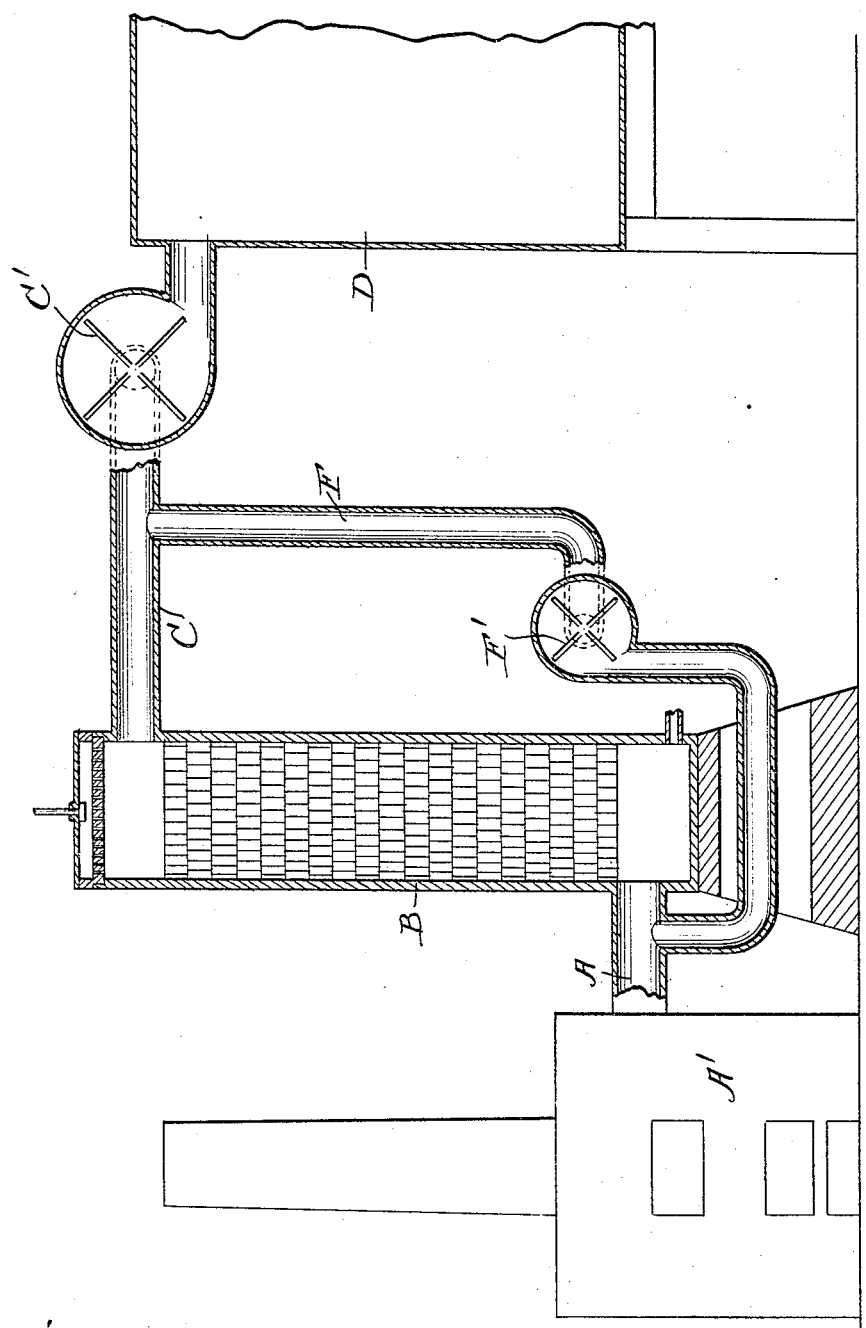

No. 765,834. Patented July 26, 1904.

UNITED STATES PATENT OFFICE.

HERMAN HEGELER AND NICHOLAS L. HEINZ, OF LASALLE, ILLINOIS.

APPARATUS FOR MAKING SULFURIC ACID.

SPECIFICATION forming part of Letters Patent No. 765,834, dated July 26, 1904.

Application filed December 26, 1903. Serial No. 186,631. (No model.)

*To all whom it may concern:*

Be it known that we, HERMAN HEGELER and NICHOLAS L. HEINZ, of Lasalle, in the county of Lasalle and State of Illinois, have invented certain new and useful Improvements in Apparatus for Making Sulfuric Acid, of which the following is a specification.

The invention relates to sulfuric-acid-making apparatus in which a Glover or filled tower is employed in conjunction with a sulfur-burner and one or more acid-chambers; and the object is to provide means for carrying out an improvement in that part of the process worked out in the Glover tower whereby the oxidation of the sulfurous gases from the burner is caused to occur in the Glover tower to an increased extent over the previous process and without increased heat affects all in the manner set forth in our application for United States Letters Patent, Serial No. 108,908, filed May 26, 1902, entitled "Improvement in processes for making sulfuric acid." We attain this object by means of the construction illustrated in the accompanying drawing, which represents a portion of an apparatus of the class mentioned in longitudinal vertical section through the Glover tower and acid-chamber and the flues connected with the same as made to embody our invention.

In the drawing, A designates the flue leading from the sulfur-burners A' (shown in outlines) to the Glover tower B, which is filled with acid-proof material, provided with interstices adapted to split up and retard the passage of the gaseous materials therein and the trickling acids and bring the gases and acids into contact.

C is a flue leading from the top of the tower B to the acid-chambers D and thence onto the Gay-Lussac tower, which is not shown. The flue A, conveying the sulfurous gases from the burners, enters the Glover tower at the bottom, so as to deliver these gases into the tower at the bottom.

C' is a fan in the flue C near its entrance into the leaden chamber D.

All of the parts thus far mentioned are of ordinary construction and arrangement, the fan C' operating to promote and maintain a regular through draft in the system.

In place of the Glover tower there may be substituted a tower filled with ferric oxid, platinum-asbestos, or other ordinary substance producing catalytic action. To this is added a flue F, which is shown as connected with the flue C at a point between C' and the Glover tower and extended to and communicating with the flue A near the bottom of the tower. This flue F is provided with a fan F' near the bottom of the tower, by means of which some of the gases passing from the top of the tower are drawn off and forced into the flue A at the bottom, so as to mix with the sulfurous gases coming from the burners as they enter the tower. By this operation the volume of gases passing through the Glover tower is increased over that passing through the other portions of the system by as much as that portion of the materials passing through the flue F must pass twice or more times through the said filled tower. This obviously increases the resistance with the square, and the speed of the fan C' in the flue C is proportionately increased to overcome the increased resistance of the said tower and retain the regular through draft of the system over the effect of the fan F'.

The distinguishing feature of the invention consists in a main flue comprising the part A, in which the gaseous materials have free passage; the part B, provided with filling by which the materials are split up or divided and meet with resistance in their passage through said part; the part C, in which the materials again have free passage, provided with a fan for promoting and maintaining a regular through draft in said main flue, and an enlarged part D, in which the passing materials are diluted or spread out and their movement slowed, and a secondary flue F, provided with a fan F' and communicating with the main flue before and after the filled part B, for forcing a part of the gaseous materials passing in the main flue twice or more times through said filled part, the two fans coöperating to increase the force of the draft in said filled part proportionately with the increased work so put upon it.

What is claimed is—

5    In an apparatus of the class described, the combination with a main flue provided with a filled section and free open sections before and after the filled section, of a fan in the free section after the filled section and a secondary flue communicating with the main flue before and after the filled section and provided with a fan, as and for the purpose specified.

HERMAN HEGELER.
NICHOLAS L. HEINZ.

Witnesses:
ROBERT C. WELTER,
EMIL ZENTZIRE.